Oct. 10, 1939.   R. O. HOYT   2,176,008
ACTUATING MECHANISM
Filed June 25, 1937

Inventor
ROBERT O. HOYT
By Beaman + Langford
Attorneys

Patented Oct. 10, 1939

2,176,008

UNITED STATES PATENT OFFICE 2,176,008

ACTUATING MECHANISM

Robert O. Hoyt, Jackson, Mich., assignor to The Tomkins-Johnson Company, Jackson, Mich., a corporation of Michigan Application June 25, 1937, Serial No. 150,357

4 Claims. (Cl. 121—38)

This invention relates to riveting machines and more particularly to an actuating mechanism therefor.

In the copending application of Harold A. Tomkins, Serial No. 53,404, filed December 7, 1935, there is disclosed a riveting machine having feeding mechanism actuated by a piston movable in a cylinder by compressed air. In said application there is provided a manual control for movement of the piston in one direction and an automatic control for movement of the piston in the opposite direction. The automatic control comprises an air release button which has not proved to be entirely satisfactory. The present invention comprises a different automatic control in which moving parts are eliminated and which is more efficient than the one formerly used.

Accordingly an object of the invention is to provide an actuating mechanism having an automatic control.

Another object of the invention is to provide an actuating piston and piston rod, the piston rod having porting for controlling the movement of the piston.

Figure 1:
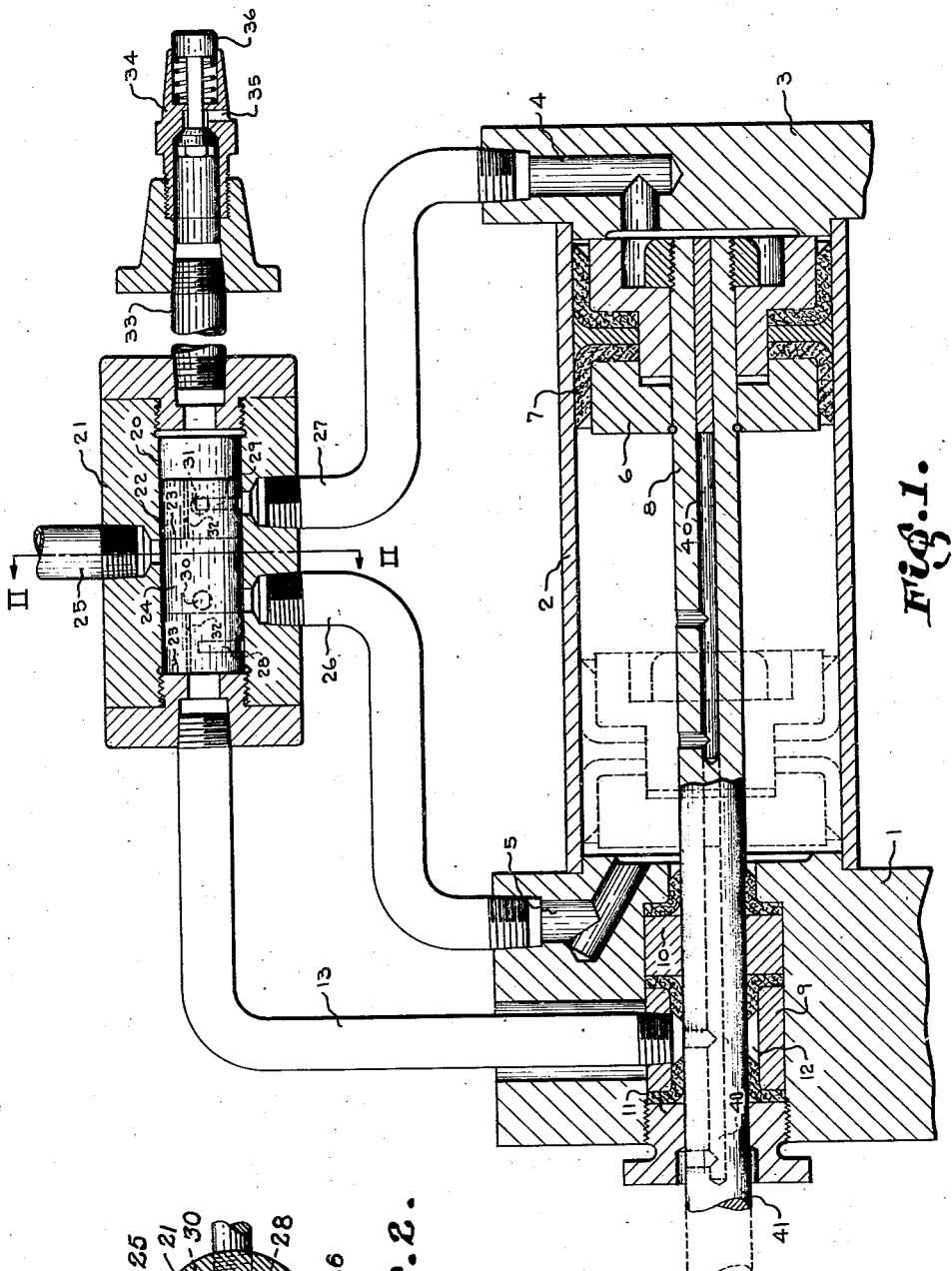
Figure 2:
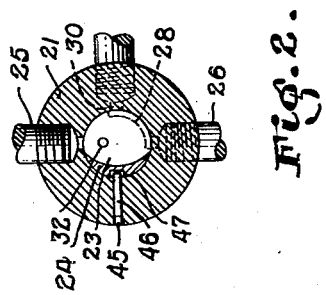

These and other objects will be apparent from the following specification when taken with the accompanying drawing, in which Fig. 1 is a vertical section disclosing the invention, and Fig. 2 is a section on the line II—II of Fig. 1 disclosing details of the distributing valve.

Referring particularly to the drawing the reference character 1 indicates a riveting machine on which is mounted one end of a cylinder 2. The opposite end of the cylinder 2 is provided with a closing plate 3 having a port 4 communicating with one end of the interior of the cylinder 2. A port 5 communicates with the other end of the cylinder 2. Disposed within the cylinder 2 is a piston 6 provided with suitable packing rings 7, connected rigidly to a piston rod 8 which extends through a stuffing box 9 in the riveting machine 1. The stuffing box 9 is compound having an inner portion 10 and an outer portion 11, each portion being provided with suitable packing. The portions 10 and 11 are separated by an annular enclosed space 12. Communicating with the annular space 12 is a conduit 13 which also communicates with one end of the cylinder 20 in the distributing valve 21. It will be observed that the annular space 12 and the conduit 13 are sealed off by the piston rod 8.

Within the cylinder 20 of the distributing valve 21 is disposed a piston 22 having spaced substantially cylindrical portions 23 connected by a bridging member 24. Communicating with one side of the central part of the cylinder 20 is a compressed air inlet conduit 25. Communicating with the opposite side of the cylinder 20 are compressed air outlet conduits 26 and 27 which in turn communicate with the ports 5 and 4, respectively.

On the cylindrical portions 23 are disposed superficial grooves 28 and 29 for providing a communication between the outlet conduits 26 and 27 and the exhaust ports 30 and 31 in the distributing valve 21, the exhaust ports 30 and 31 extending from the interior of the cylinder 20 to the atmosphere. Thus, as the piston 22 is reciprocated within the cylinder 20 compressed air from the inlet conduit 25 is directed to either the outlet conduit 26 or the outlet conduit 27 by the space between the cylindrical portions 23. At the same time compressed air is exhausted from the outlet conduit 26 or 27 not receiving compressed air, through one of the superficial grooves 28 or 29 and outlet port 30 or 31. As disclosed in the drawing, compressed air is flowing from the inlet conduit 25 through the outlet conduit 26 to the port 5 and the left end of the cylinder 2. At the same time the right end of the cylinder 2 is being exhausted through the port 4, the conduit 27, superficial groove 29 and the outlet port 31.

The cylindrical portions 23 of the piston 22 have leakage ports 32 providing communication between the respective ends of the cylinder 20 of the distributing valve 21 and the space between the cylindrical portions 23. Thus, when one of the ends of the cylinder 20 is opened to the atmosphere and the pressure therein exhausted the piston 22 will be moved to that end by the compressed air in the other end and will direct compressed air from the inlet conduit 25 to the corresponding outlet conduit 26 or 27.

The right end of the cylinder 20 is connected by a conduit 33 to a push button valve 34 of any standard construction arranged to exhaust to the atmosphere through the port 35 upon pressure being exerted upon the spring stressed button 36. It will be obvious that upon release of the pressure on the button 36 the valve 34 will move to closed position. The opposite end of the cylinder 20 is exhausted through the conduit 13. In order to keep the piston 22 from rotating with respect to the body of the distributing valve 21, the body is provided with a bore 45 in which is press fitted or otherwise suitably secured a pin 46 which has the inner end thereof disposed in a groove 47 in the surface of the bridging member 24.

The particular structure for exhausting through the conduit 13 comprises a U-shaped port 40 in the piston rod 8. The port 40 is formed by drilling centrally in from the right end of the bore thus provided, plugging up the outer end of the piston rod 8, and drilling radially from the surface of the piston rod 8 spaced bores communicating with the central bore. The radial bores of the port 40 are spaced sufficiently to provide a communication between the annular spacing 12 communicating with the conduit 13 and the atmosphere, at the end of the stuffing box 9 as shown in dotted lines.

The piston rod 8 is connected to an actuating member 41 which in the present case actuates the rivet positioning member as disclosed in the aforesaid application of Harold A. Tomkins, Serial No. 53,404. In operation should it be desired to position a rivet the push button 36 of the valve 34 is manually pressed, it being understood that the valve 34 may be disposed at any convenient place about the machine. Air from the right end of the cylinder 20 of the distributing valve 21 is then exhausted and the piston 22 moves to the right directing compressed air from the conduit 25 through the conduit 27 and the port 4 at the right end of the cylinder 2. The piston 6 and piston rod 8, together with the actuating member 41 are then forced to the left, the left end of the cylinder 2 being exhausted through the port 5, the conduit 26, the superficial groove 28 and the exhaust port 30. When the piston rod 8 has reached the limit of its stroke to the left the bore 40 provides a communication from the atmosphere through the annular space 12 and the conduit 13 to the left end of the cylinder 20. The compressed air which has leaked through the leakage valve 32 to the left end of the cylinder 20 is then exhausted through said communication to the atmosphere, the piston 23 moves to the left end of the cylinder 20 and compressed air from the inlet conduit 25 is directed through the outlet conduit 26 and the port 5 to the left end of the cylinder 2 to return the piston 6 and the piston rod 8 and the actuating member 41 to their starting position. It will be, thus, seen that the movement of the actuating member 41, in one direction, is brought about by a manual control and its movement in the opposite direction is by an automatic control.

In the aforesaid application of Harold A. Tomkins, Serial No. 53,404, the actuating member actuated a push button valve similar to the push button exhausting valve disclosed herein, to exhaust the left end of the distributing valve to return the main piston to its starting position. It will be seen that the present structure reduces the number of moving parts and provides a structure which is more simple and more positive in operation. It will, of course, be clear that the invention is not limited to riveting machines but may have other uses. Also other equivalent forms of ports may be substituted for the port 40. Should it be desirable to operate the distributing valve 21 directly by compressed air rather than by exhausting compressed air or to operate an exhausting valve by compressed air, an air supply conduit could be built into the stuffing box 9 for connection to the conduit 13 by the port 40. An example of a distributing valve operated by compressed air is disclosed in the copending application of Harold A. Tomkins et al., Serial No. 86,106, filed June 19, 1936 and issued as Patent No. 2,132,811 on October 11, 1938. As there is no clear line between the piston rod 8 and the actuating member 41, and there need not be one, the expression "operating member" has been used in the claims to designate both the actuating member 41 and the piston rod 8.

Having thus described my invention what I desire to secure by Letters Patent and claim is:

1. A device of the character described comprising, an operating member including a piston rod, a piston for moving the same, a cylinder in which said piston is slidable, a compound stuffing box at one end of said cylinder through which said piston rod is slidable, the compound stuffing box comprising two spaced portions and means enclosing the space between said portions, means responsive to the release of pressure to control the movement of operating fluid with respect to said cylinder and piston to move said piston in one direction or the other, a pressure releasing conduit communicating with said first named means, the outer end of said conduit communicating with the space in said stuffing box, said space being sealed by said piston rod, and port means in said piston rod for providing communication between said pressure releasing conduit and the atmosphere when said piston is at one end of said cylinder to actuate said means to control the movement of the operating fluid to move said piston to the other end of said cylinder, said port means comprising a longitudinal passage in said piston rod and spaced substantially radially extending ports in said piston rod communicating with said longitudinal passage.

2. A device of the character described comprising, an operating member including a piston rod, a piston for moving the same, a cylinder in which said piston is slidable, a stuffing box through which said piston rod passes, means responsive to the release of fluid pressure to control the movement of operating fluid with respect to said cylinder and piston to move said piston in one direction or the other, a pressure releasing conduit communicating with said means and having the free end thereof adjacent said stuffing box and sealed by said piston rod, at least a portion of said stuffing box being disposed between the free end of said pressure releasing conduit and of said piston, and a port in said piston rod to provide communication between the free end of said conduit and the atmosphere when said piston is in one end of said cylinder to release pressure to actuate said means to control the movement of the operating fluid to move said piston to the other end of said cylinder, said port being U-shaped, one leg of said U being in alignment with said pressure releasing conduit, and the other leg of said U communicating with the atmosphere when said port is in pressure releasing position.

3. A device of the character described comprising an operating member including a piston rod, a piston for moving the same, a cylinder in which said piston is slidable, a compound stuffing box at one end of said cylinder through which said piston rod is slidable, the compound stuffing box comprising two spaced portions and means enclosing the space between said portions, means responsive to the release of pressure to control the movement of operating fluid with respect to said cylinder and piston to move said piston in one direction or the other, a pressure releasing conduit communicating with said first named means, the outer end of said conduit communicating with the space in said stuffing box, said space being sealed by said piston rod, and port means in said piston rod for providing communication between said pressure releasing conduit and the atmosphere when said piston is at one end of said cylinder to actuate said means to control the movement of the operating fluid to move said piston to the other end of said cylinder, said port means comprising a longitudinal passage in said piston rod, and spaced substantially radially extending ports in said piston rod communicating with said longitudinal passage, one of said radially extending ports communicating with said space and the other of said radially extending ports being opened to the atmosphere when said port is in pressure releasing position.

4. In a device of the character described, a cylinder, a piston reciprocable within said cylinder, a piston rod reciprocable with said piston, a head at one end of said cylinder, a passage through said head for said piston rod, a stuffing box in said passage, a port in said head communicating with said passage, and port means in said piston rod for providing a communication between said first named port and the atmosphere, said port means comprising a longitudinal passage in said piston rod with spaced substantially radially extending ports in said piston rod communicating with said longitudinal passage, said port means bridging at least a portion of said stuffing box.

ROBERT O. HOYT.